(12) United States Patent
Suarez

(10) Patent No.: US 9,796,402 B1
(45) Date of Patent: Oct. 24, 2017

(54) ELECTRONIC SHOPPING CART

(71) Applicant: Michael Suarez, Brooklyn, NY (US)

(72) Inventor: Michael Suarez, Brooklyn, NY (US)

( * ) Notice: Subject to any disclaimer, the term of this patent is extended or adjusted under 35 U.S.C. 154(b) by 0 days.

(21) Appl. No.: 15/291,956

(22) Filed: Oct. 12, 2016

Related U.S. Application Data

(60) Provisional application No. 62/240,899, filed on Oct. 13, 2015.

(51) Int. Cl.
| | | |
|---|---|---|
| *B62B 5/00* | (2006.01) | |
| *B62B 5/06* | (2006.01) | |
| *B62B 3/02* | (2006.01) | |
| *B60K 1/04* | (2006.01) | |
| *B60L 11/18* | (2006.01) | |
| *H02J 7/00* | (2006.01) | |

(52) U.S. Cl.
CPC .............. *B62B 5/0053* (2013.01); *B60K 1/04* (2013.01); *B60L 11/1818* (2013.01); *B60L 11/1825* (2013.01); *B62B 3/027* (2013.01); *B62B 5/0013* (2013.01); *B62B 5/0046* (2013.01); *B62B 5/0069* (2013.01); *B62B 5/065* (2013.01); *H02J 7/0027* (2013.01); *B60K 2001/0416* (2013.01); *B60L 2220/20* (2013.01); *B60L 2230/12* (2013.01); *B60L 2240/421* (2013.01); *B60Y 2200/91* (2013.01); *B60Y 2400/112* (2013.01); *B60Y 2400/602* (2013.01); *B62B 2205/20* (2013.01); *B62B 2205/26* (2013.01); *B62B 2206/06* (2013.01); *B62B 2301/252* (2013.01)

(58) Field of Classification Search
CPC ... B62B 5/0026; B62B 5/0033; B62B 5/0069; B62B 5/0053; B62B 5/0036; B62B 3/027; B62B 2205/26
See application file for complete search history.

(56) References Cited

U.S. PATENT DOCUMENTS

| | | | | |
|---|---|---|---|---|
| 4,570,731 | A * | 2/1986 | Oaks | B60L 11/1805 180/19.3 |
| 5,899,285 | A * | 5/1999 | Curbelo | B62B 5/0026 180/65.1 |
| 6,196,975 | B1 * | 3/2001 | Labrecque | A61D 3/00 119/453 |
| 6,793,630 | B2 * | 9/2004 | Labrecque | A61D 3/00 119/453 |
| 7,699,128 | B1 * | 4/2010 | Strauss | B62B 5/002 180/23 |
| 9,352,764 | B1 * | 5/2016 | Kossowsky | B62B 3/02 |
| 2002/0185321 | A1 * | 12/2002 | Lin | B62B 5/0026 180/219 |
| 2004/0201187 | A1 * | 10/2004 | Ondrasik | B62B 3/1404 280/33.991 |
| 2005/0156406 | A1 * | 7/2005 | Prather | B62B 3/027 280/651 |

(Continued)

*Primary Examiner* — Brian Swenson
(74) *Attorney, Agent, or Firm* — RG Patent Consulting, LLC; Rachel Gilboy

(57) ABSTRACT

A rechargeable motorized personal shopping and utility cart. Designed for elderly or infirm consumers who find it difficult to pull or push a manual utility cart, particularly on inclines, the electronic shopping cart would propel itself on demand. Designed in every aspect for the ultimate in convenience, the front of the unit would also feature an easy-access swing-open door which makes the loading and unloading of the electronic shopping cart far easier, even for extra tall items.

12 Claims, 4 Drawing Sheets

(56) References Cited

U.S. PATENT DOCUMENTS

| | | | |
|---|---|---|---|
| 2012/0160577 A1* | 6/2012 | Anasiewicz | B62D 51/04 180/19.1 |
| 2012/0274052 A1* | 11/2012 | Zhu | B62B 3/027 280/651 |
| 2014/0183844 A1* | 7/2014 | Iryami | B62B 3/027 280/659 |
| 2015/0066274 A1* | 3/2015 | Hijikata | B62B 5/0073 701/22 |
| 2015/0274187 A1* | 10/2015 | Storch | B62B 7/042 280/47.38 |

* cited by examiner

ELECTRONIC SHOPPING CART

CROSS-REFERENCE TO RELATED APPLICATION

The present application is related to and claims priority from prior provisional application Ser. No. 62/240,899, filed Oct. 13, 2015 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention. It is not an admission that any of the information provided herein is prior art, or material, to the presently described or claimed inventions, or that any publication or document that is specifically or implicitly referenced is prior art.

FIELD OF THE INVENTION

The present invention relates generally to the field of shopping cart devices and more specifically relates to a rechargeable motorized personal shopping and utility cart. Designed for elderly or infirm consumers who find it difficult to pull or push a manual utility cart, particularly on inclines, the electronic shopping cart propels itself on demand. Designed in every aspect for the ultimate in convenience, the front of the unit also features an easy-access swing-open door which makes the loading and unloading of the cart far easier, even for extra tall items.

DESCRIPTION OF THE RELATED ART

As strange as this may seem, the consumer economy of today, a shopper's paradise of supermarkets, discount home stores, and big-box retailers, was brought into existence largely by one invention—the shopping cart.

Throughout the 1930s and 40s, both automobiles and electric refrigerators were getting larger. As a consequence, families were able to buy, transport, and store more groceries at home. Prior to the invention of the shopping cart, however, stores provided customers with only wire hand-baskets in which to collect and carry their purchases, and these baskets had a limited capacity. So, although shoppers had sufficient room in their cars, and sufficient space in their home refrigerators, the stores themselves were limiting the amount of their purchase! Encountering this problem in the late 1930s, Sylvan Goodman, the founder of Piggly-Wiggly grocery stores, invented a two-basket shopping trolley, which evolved into the shopping carts we know today. With Goodman's invention, consumers could collect, buy, and transport much larger volumes—and as a consequence of this, the stores themselves began to grow into the supermarkets and superstores we know today.

We may think of shopping carts as a convenience that awaits us at the supermarket, but for millions of consumers—the elderly, apartment-dwellers, and urban residents, for example—the use of a personally-owned, wheeled utility or shopping cart is a personal convenience of everyday life, even a necessity. Typically, such carts are four-wheeled, lightweight and upright, constructed of rubber-encased, sturdy steel wire. The carts are something of a cross between a traditional hand-truck or dolly and a commercial shopping cart, and can be maneuvered on all four wheels, in a level orientation, or tilted and pulled or pushed on the back wheels only. These carts enable a person to carry far more cargo than they could carry in their hands alone, and enable an individual to transport a carload of groceries, for example, from underground parking deck to a 10th floor apartment, in one trip rather than several.

Still, these personal utility or shopping carts do possess several significant drawbacks. Foremost among these is the simple fact that they have to be pushed or pulled—and thus require a level of exertion beyond the capability of many, particularly the elderly, who depend upon them. They also load and unload, invariably, from the top. This means that the consumer must lift heavy purchases—a 25-pound bag of dog food, for example—up and into the cart; and then bend over, reach down into the cart, and lift it out again to unload the purchase at home. Awkward and off-balance, such bending and lifting puts a serious, potentially hazardous strain upon the back.

Various attempts have been made to solve the above-mentioned problems such as those found in U.S. Pat. No. 4,020,916 to Roy A. Noble; U.S. Pat. No. 4,771,840 to Richard A. Keller; U.S. Pat. No. 6,279,672 to Martine Losego. This art is representative of self-propelled shopping carts.

None of the above inventions and patents, taken either singly or in combination, is seen to describe the invention as claimed. Thus, a need exists for a reliable electronic shopping cart, a rechargeable motorized personal shopping and utility cart. Designed for elderly or infirm consumers who find it difficult to pull or push a manual utility cart, particularly on inclines, the electronic shopping cart propels itself on demand. Designed in every aspect for the ultimate in convenience, the front of the unit also features an easy-access swing-open door which makes the loading and unloading of the cart far easier, even for extra tall items and to avoid the above-mentioned problems.

BRIEF SUMMARY OF THE INVENTION

In view of the foregoing disadvantages inherent in the known shopping cart device art, the present invention provides a novel electronic shopping cart. The general purpose of the present invention, which will be described subsequently in greater detail is to provide a rechargeable motorized personal shopping and utility cart. Designed for elderly or infirm consumers who find it difficult to pull or push a manual utility cart, particularly on inclines, the electronic shopping cart propels itself on demand. Designed in every aspect for the ultimate in convenience, the front of the unit also features an easy-access swing-open door which makes the loading and unloading of the cart far easier, even for extra tall items.

The electronic shopping cart would be fabricated in a tough and sturdy, coated metal wire. Included, are four caster-type solid rubber wheels; the two rear wheels, larger in diameter; and two, smaller, full-rotation ball caster spherical ball wheels located in front. The spherical ball wheels will prevent the cart from getting stuck on and in cracks in pavement, and elsewhere. Other features include the easily accessed square cargo bin; a large-range height adjustable handlebar for pushing, pulling, and steering; an optional retractable close hanger (helpful when picking up dry-cleaning); a removable rear plastic basket with an angled lid which automatically closes (via gravity), protecting one's goods from inclement weather. The handlebar has a control panel which operates and controls the movement of the drive mechanism.

The present invention holds significant improvements over known electronic shopping carts. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate an embodiment for the present invention, Electronic Shopping Cart, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a shopping cart device and more particularly to an electronic shopping cart 1, a rechargeable motorized personal shopping and utility cart. Designed for elderly or infirm consumers who find it difficult to pull or push a manual utility cart, particularly on inclines, the electronic shopping cart 1 would propel itself on demand. Designed in every aspect for the ultimate in convenience, the front of the unit would also feature an easy-access swing-open door 2 which makes the loading and unloading of the electronic shopping cart 1 far easier, even for extra tall items.

Generally speaking, with reference to drawing FIGS. 1-5, the Electronic Shopping Cart 1 comprises a novel product offering consumers a practical solution to the aforementioned challenges. As the name implies, the electronic shopping cart 1 comprises a specially designed motorized personal shopping and general-purpose utility cart—a cart that would propel itself on level or inclined terrain, and features an easy-load design for optimal user convenience.

Figure 1:
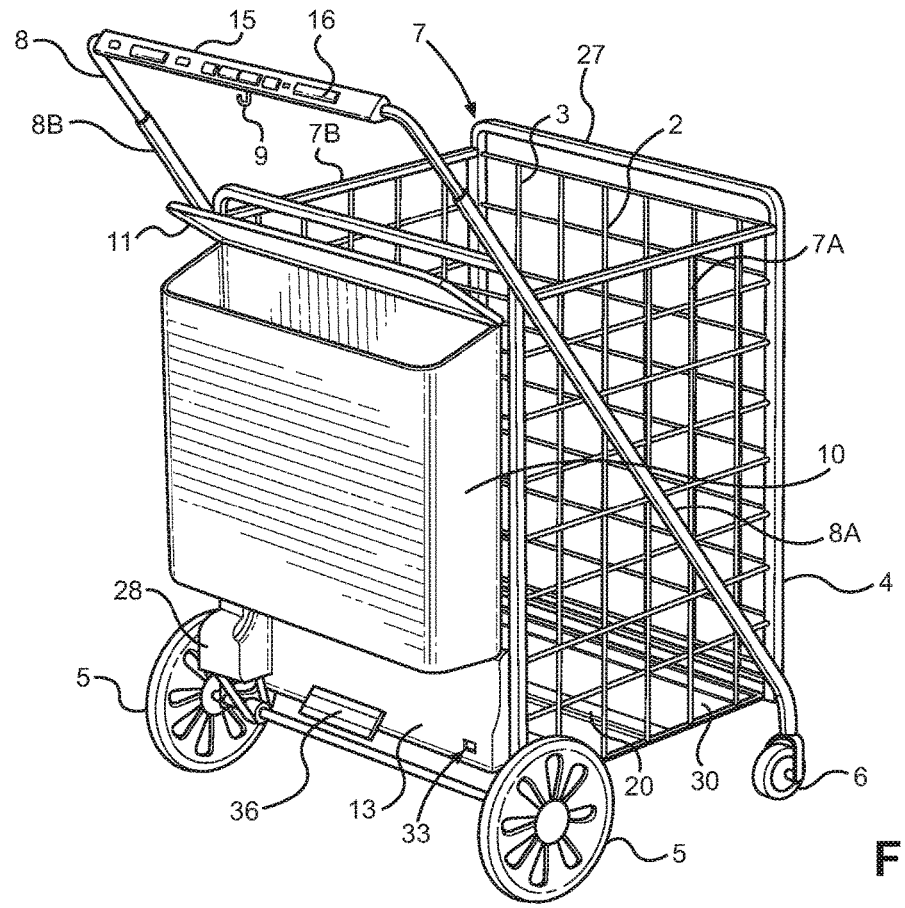
FIG. 1 shows a rear view illustrating an Electronic Shopping Cart according to an embodiment of the present invention.

Referring to the drawings by numerals of reference, and in particular FIG. 1, an electronic shopping cart 1 is shown made of tough and sturdy coated metal wire 4 for consumers who find it difficult to push or pull a manual utility cart. The electronic shopping cart 1 comprises an easily accessed square cargo bin 7 having an open upper end 3, and a closed lower end defining a floor 30 which has a front edge 30A and a rear edge 30B. The square cargo bin 7 also has opposed side walls 7A and 7B as well as a rear wall 7C which are configured to collapse into a folded position for easy storage. A particular feature of the square cargo bin 7 is the easy-access swing-open door 2 which opposes the rear wall 7C.

An electrically powered rotary motor 12 is secured to an outer surface of the rear wall 7C of the square cargo bin 7 and a rechargeable battery-pack 13 is in communication with the motor 12 and secured approximate thereto on the outer surface of the rear wall 7C of the cargo bin 7. The battery-pack 13 includes a foot post 36 to aid a user in levering the electronic shopping cart over a curb. A removable plastic basket 10 is also secured to the outer surface of rear wall 7C of the cargo bin 7. The removable plastic basket 10 has an angled lid 11 which automatically closes (via gravity), protecting one's goods from inclement weather.

Beyond the self-propulsion capacity, the electronic shopping cart 1 presents users with another unique feature: an easy-access swing-out front door 2 (opens from right to left) designed to enable the user to load and unload the electronic shopping cart 1 without ever having to lift or lower articles over the sides. Even extra tall items like a carpet roll, which would otherwise have to be lifted over the side when using an ordinary cart, are easily handled.

Figure 4:
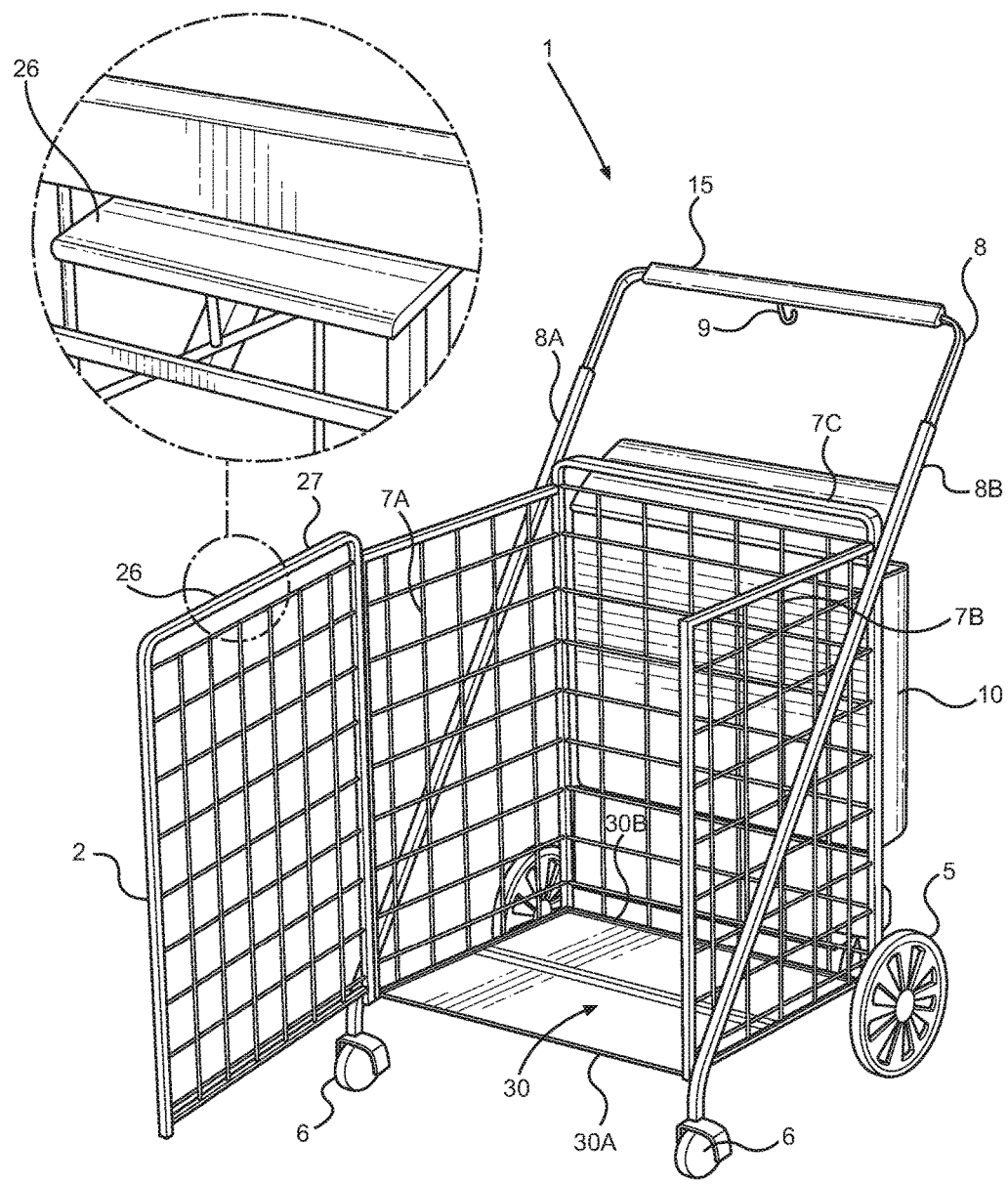
FIG. 4 is a perspective front view of the Electronic Shopping Cart illustrating the easy-access swing-open door with the latch mechanism shown in magnified detail according to an embodiment of the present invention of FIG. 1.

Referring now to FIG. 4, the easy-access swing-open door 2 is shown in the open position. A latch 26 is positioned at the top 27 of the door 2 and is shown in magnified detail. The latch 26 enables one to open and close the door 2 and is strategically placed at the top 27 of the easy-access swing-open door 2, instead of the bottom, to allow users to open the electronic shopping cart 1 without ever having to bend over. The latch 26 is configured to keep the swing-open door 2 closed and when pressed upon permits the swing-open door 2 to open. This should also appeal strongly to users confined to a wheelchair, as the latch 26 would now be easily within reach.

The electronic shopping cart 1 also includes a U-shaped handlebar 8 having a handle bar middle portion 15 and height adjustable side bars 8A and 8B with ends secured adjacent the front edge 30A of the floor 30 of the electronic shopping cart 1 proximate the side walls 7A and 7B of the cargo bin 7. The adjustable side bars 8A and 8B extend upwardly from the open upper end 3 of the electronic shopping cart 1 so that the handlebar 8 is easily grasped by a user. An optional retractable clothes hanger 9 is also found on the handlebar 15. The retractable clothes hanger 9 is useful for picking up dry-cleaning.

Figure 3:
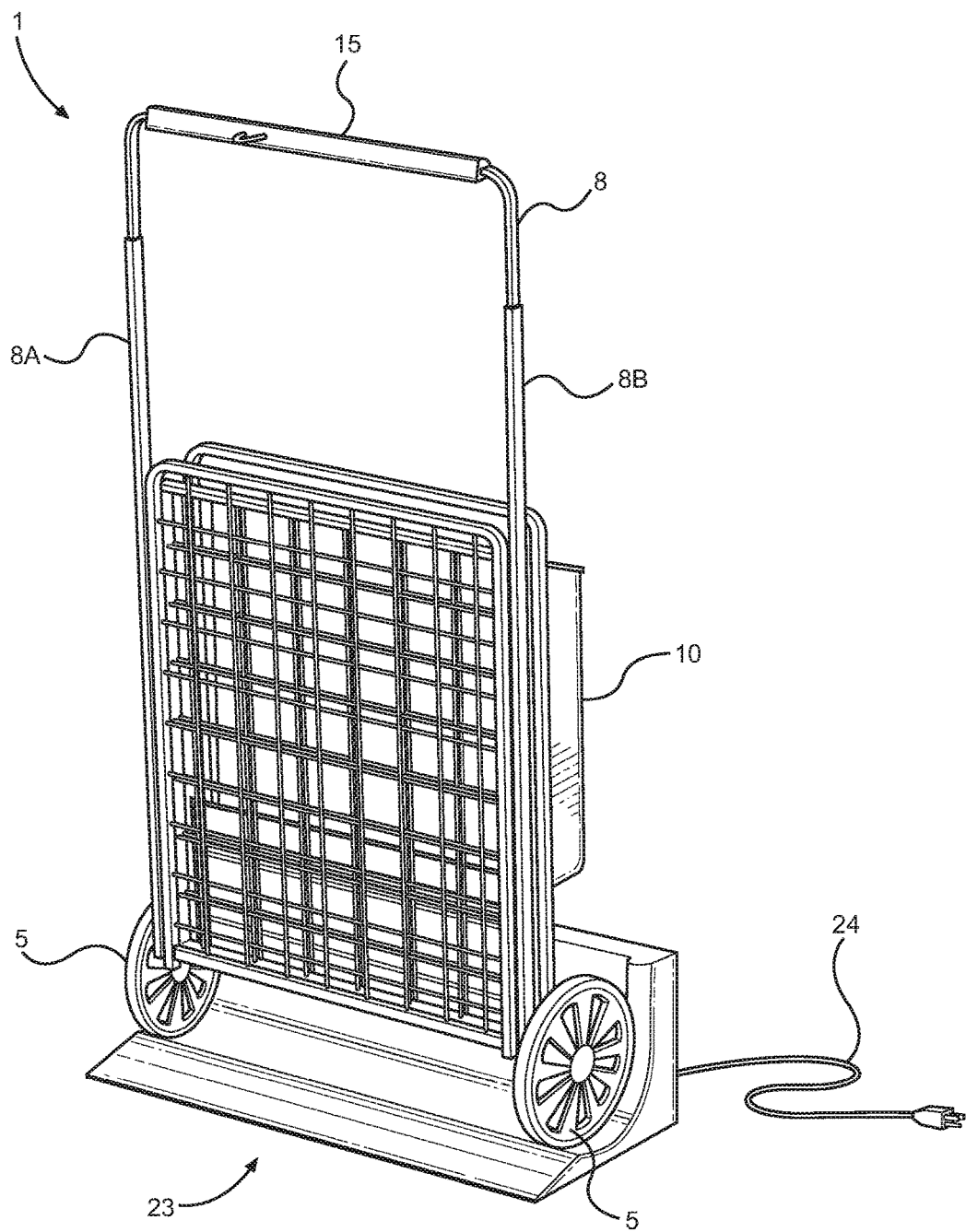
FIG. 3 is a perspective view illustrating The Electronic Shopping Cart in use with the charging stand according to an embodiment of the present invention of FIG. 1.

As shown in FIG. 3, the cargo bin 7 of the electronic shopping cart 1 folds up for use with the charging stand 23 which comes with the electronic shopping cart 1. The front edge 30A of the floor 30 is configured to fold up in a position adjacent to the back 7C. The rear edge 30B of the floor 30 is hingedly secured to the back 7C. The side walls 7A and 7B are configured to allow the easy-access door 2 to pivot up adjacent to the back 7C of the cargo bin 7.

Figure 2:
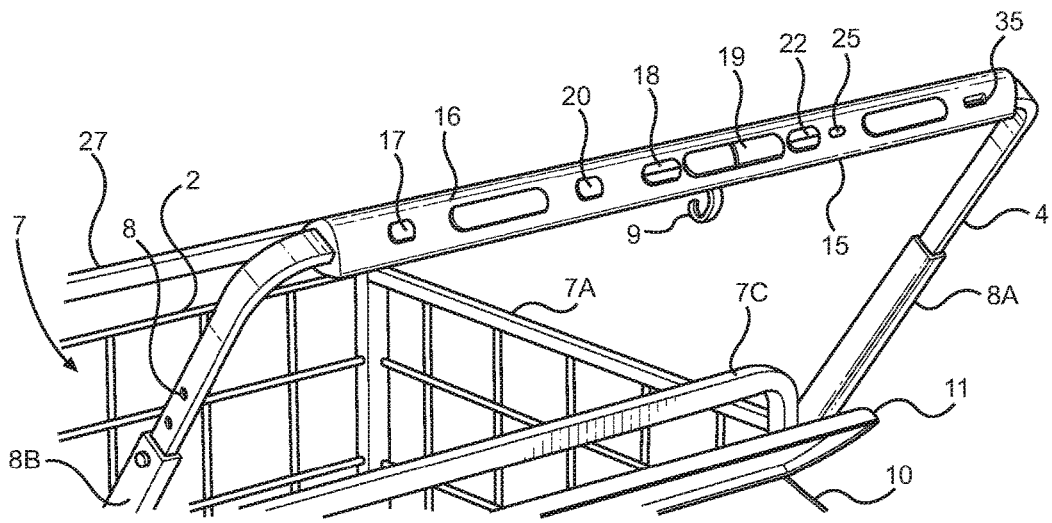
FIG. 2 is a perspective view illustrating the control panel of the Electronic Shopping Cart according to an embodiment of the present invention of FIG. 1.

A pair of full-rotation caster-type front wheels 6 are secured to the ends of the adjustable side bars 8A and 8B. Rotatably mounted to the rear of the square cargo bin 7 is an axle 31. Two larger rear wheels 5 are fixedly mounted to the axle 31. Referring now to FIG. 2, the handlebar 8 has a control panel 16. The control panel 16 includes an on/off power switch 17, a speed adjustment control 18, a switch for forward and reverse 19, a battery level indicator 25, a drive lever 22, and a button activated horn 20.

The electronic shopping cart 1 is equipped with an electrically powered D.C. rotary motor 12, powered by the rechargeable battery-pack 13 and controlled by the control panel 16 situated on the handlebar middle portion 15. The electrically powered D.C rotary motor 12 can be operated at an adjustable speed by the speed adjustment control 18 which varies the supply voltage to the motor 12 using a rheostat. The switch for forward and reverse 19 is configured to reverse the polarity of the supply voltage to the motor 12 so as to selectively drive the rear wheels 5 in the desired direction. The drive-lever 22 may be provided as a normally open push button configured to interrupt the circuit of the supply voltage to the motor 12. In its default state, the drive-lever 22 makes no electrical contact with the circuit such that there is no supply voltage provided to the motor 12 and the electronic shopping cart will go right into a manual mode. In the manual mode, a person operating the shopping cart could either switch it back into electronic or keep it in manual mode. When the drive-lever is gripped, it is pressed down and makes electrical contact with the circuit to provide the supply voltage to the motor 12. A USB port 35 is also provided on the control panel 16 for charging a cell phone.

Figure 5:
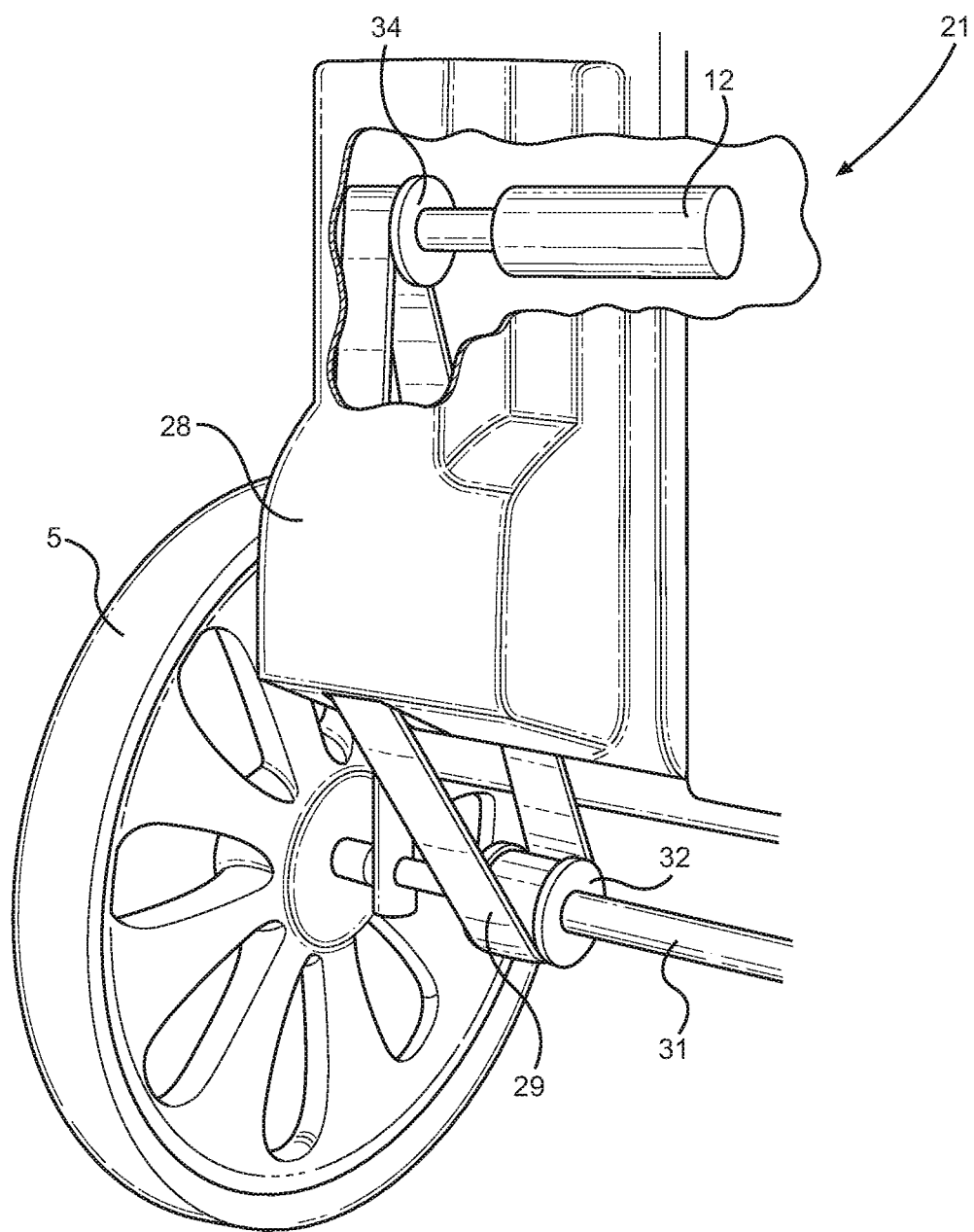
FIG. 5 is a close-up view of the drive mechanism of the Electronic Shopping Cart according to an embodiment of the present invention of FIGS. 1-4.

As shown in FIG. 5, the electronic shopping cart 1 is provided with a drive mechanism 21 which is comprised of the axle 31, a drum 32, a belt 29, and the motor 12. The drum 32 is fixedly mounted to the axle 31 for rotation therewith. The motor 12 is mounted to the electronic shopping cart 1 at a convenient location adjacent the axle 31 and is covered by a protective housing 28. A gearing 34 is mounted to the output shaft of the motor 12 for rotation therewith. The belt 29 is entrained about the gearing 34 and the drum 32 such that rotation imparted to the gearing 34 by the motor 12 transfers rotation to the axle 31 thereby propelling the rear wheels 5.

Referring to FIG. 3, to recharge the battery-pack 13 the user folds the electronic shopping cart 1 into a collapsed position and places it in the charging stand 23 which communicates with a plug receptacle 33 provided on the rechargeable battery-pack 13. The charging stand 23 is provided with a suitable electrical charging cord 24 which plugs into a standard 110-volt household outlet. Alternately, the included charging cord 24 may be plugged directly into the plug receptacle 33 of the battery-pack 13 and into a standard 110-volt household outlet. The battery indicator 25 displays the remaining life of the battery-pack 13 as well.

Whether needing to push a heavy load, or simply needing assistance up a hill, the electronic shopping cart 1 would relieve consumers—especially the elderly, infirm, obese, or physically limited—of the need to manually pull or push the electronic shopping cart 1; and the front-loading design of the electronic shopping cart 1 would make loading and unloading a breeze. With all features thoughtfully and carefully located to offer the greatest convenience possible, the tremendously useful, easy to operate, easy to load and unload, the electronic shopping cart 1 should find a wide and most enthusiastic reception in the consumer markets of America and the world.

The electronic shopping cart 1 would be fabricated in a tough and sturdy, coated metal wire 4. Included, are four caster-type solid rubber wheels; the two rear wheels 5, larger in diameter; and two, smaller, full-rotation ball caster spherical ball wheels 6 located in front. The spherical ball wheels 6 will prevent the electronic shopping cart 1 from getting stuck on and in cracks in pavement, and elsewhere. Other features previously mentioned include the easily accessed square cargo bin 7; the large-range height adjustable handlebar 8 for pushing, pulling, and steering; the optional retractable close hanger 9 (helpful when picking up dry-cleaning); and the removable rear plastic basket 10 with an angled lid 11 which automatically closes (via gravity), protecting one's goods from inclement weather.

Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An electronic shopping cart comprising:
   a square cargo bin having an open upper end, a closed lower end defining a floor having a front edge and a rear edge, opposed side walls, a rear wall and a swing-open door opposing said rear wall;
   a U-shaped handlebar having a middle portion and height adjustable side bars having ends secured adjacent said front edge of said closed lower end proximate each of said opposed side walls and extending upwardly at an angle to said rear wall proximate said opposed side walls and further extending upwardly from said open upper end so that said U-shaped handlebar is easily grasped by a user;
   a pair of front wheels secured to said ends of said adjustable side bars, an axle mounted to said rear wall of said square cargo bin and having two larger rear wheels mounted thereto for rotation therewith;
   an electrically powered rotary motor secured to an outer surface of said rear wall of said square cargo bin, said motor configured to rotate said axle so as to propel said rear wheels;
   a rechargeable battery-pack for providing a supply voltage and powering said motor, said rechargeable battery-pack secured approximate to said motor on said outer surface of said rear wall, an electrical charging plug in communication with said rechargeable battery-pack for charging said rechargeable battery-pack by a standard 110-volt household outlet;

a control panel disposed within said middle portion of said U-shaped handle bar for actuating and controlling said motor; and a recharging stand;

wherein said electrical charging plug is in communication with said recharging stand; and wherein said recharging stand is in communication with said standard 110-volt household outlet.

2. The electronic shopping cart of claim 1, wherein said axle comprises a drum fixedly mounted thereto for concurrent rotation, said motor comprising, a gearing mounted to its output shaft for rotation therewith, and further comprising a belt entrained about said gearing and said drum such that rotation imparted to said gearing by said motor transfers rotation to said axle thereby propelling said rear wheels.

3. The electronic shopping cart of claim 2, wherein said control panel comprises an on and off power switch, a speed adjustment control, a forward and reverse switch, and a drive-lever for activating and controlling said motor.

4. The electronic shopping cart of claim 3, wherein said drive-lever comprises a normally open push button configured to interrupt the supply voltage to said motor.

5. The electronic shopping cart of claim 3, wherein said motor is operated at an adjustable speed by said speed adjustment control which is configured to vary the supply voltage to said motor.

6. The electronic shopping cart of claim 3, wherein said forward and reverse switch is configured to reverse the polarity of the supply voltage to said motor so as to selectively drive said rear wheels in a desired direction.

7. The electronic shopping cart of claim 2 wherein said control panel further comprises a USB port for charging a cell phone.

8. The electronic shopping cart of claim 1 wherein said square cargo bin is configured to be folded so as to be easily stored and used with said recharging stand.

9. The electronic shopping cart of claim 1 wherein said U-shaped handlebar further comprises a retractable clothes hanger useful for hanging clothes.

10. The electronic shopping cart of claim 1 wherein said swing-open door further comprises a top which includes a latch which is configured to keep said swing-open door closed and when pressed upon permits said swing-open door to open.

11. The electronic shopping cart of claim 1 wherein said battery-pack includes a foot post to aid a user in levering said shopping cart over a curb.

12. An electronic shopping cart comprising:

a square cargo bin having an open upper end, a closed lower end defining a floor having a front edge and a rear edge, opposed side walls, a rear wall and a swing-open door opposing said rear wall;

a U-shaped handlebar having a middle portion and height adjustable side bars having ends secured adjacent said front edge of said closed lower end proximate each of said opposed side walls and extending upwardly at an angle to said rear wall proximate said opposed side walls and further extending upwardly from said open upper end so that said U-shaped handlebar is easily grasped by a user;

a pair of front wheels secured to said ends of said adjustable side bars, an axle mounted to said rear wall of said square cargo bin and having two larger rear wheels mounted thereto for rotation therewith;

an electrically powered rotary motor secured to an outer surface of said rear wall of said square cargo bin, said motor configured to rotate said axle so as to propel said rear wheels;

a rechargeable battery-pack for providing a supply voltage and powering said motor, said rechargeable battery-pack secured approximate to said motor on said outer surface of said rear wall, an electrical charging plug in communication with said rechargeable battery-pack for charging said rechargeable battery-pack by a standard 110-volt household outlet;

a control panel disposed within said middle portion of said U-shaped handle bar for actuating and controlling said motor; and a removable plastic basket disposed on an outside surface of said square cargo bin, said removable plastic basket having an angled lid which automatically closes via gravity, for storing and protecting items from inclement weather.

* * * * *